US012731784B2

(12) United States Patent
Hasegawa et al.

(10) Patent No.: US 12,731,784 B2
(45) Date of Patent: Sep. 8, 2026

(54) ELECTRODE, NONAQUEOUS ELECTROLYTE BATTERY, AND BATTERY PACK

(71) Applicant: KABUSHIKI KAISHA TOSHIBA, Tokyo (JP)

(72) Inventors: Takuya Hasegawa, Yokohama (JP); Natsuki Otani, Yokohama (JP); Naoki Nishio, Yokohama (JP)

(73) Assignee: KABUSHIKI KAISHA TOSHIBA, Kawasaki (JP)

(*) Notice: Subject to any disclaimer, the term of this patent is extended or adjusted under 35 U.S.C. 154(b) by 588 days.

(21) Appl. No.: 18/338,524

(22) Filed: Jun. 21, 2023

(65) Prior Publication Data

US 2023/0361292 A1 Nov. 9, 2023

Related U.S. Application Data

(63) Continuation of application No. PCT/JP2021/046550, filed on Dec. 16, 2021.

(51) Int. Cl.
*H01M 4/505* (2010.01)
*H01M 4/131* (2010.01)
(Continued)

(52) U.S. Cl.
CPC ........... *H01M 4/505* (2013.01); *H01M 4/131* (2013.01); *H01M 4/525* (2013.01); *H01M 2004/021* (2013.01)

(58) Field of Classification Search
CPC ........... H01M 4/00–98; H01M 2004/021–029; H01M 2004/8678–8694
(Continued)

(56) References Cited

U.S. PATENT DOCUMENTS

2019/0319257 A1 10/2019 Ogawa et al.
2020/0020951 A1 1/2020 Furusawa et al.
(Continued)

FOREIGN PATENT DOCUMENTS

JP 2001093582 A 4/2001
JP 5094144 B2 12/2012
(Continued)

OTHER PUBLICATIONS

International Search Report (with English Translation) and Written Opinion mailed Mar. 8, 2022, in corresponding International Application No. PCT/JP2021/046550, 11 pages.
(Continued)

*Primary Examiner* — Bach T Dinh
(74) *Attorney, Agent, or Firm* — Maier & Maier, PLLC

(57) ABSTRACT

According to one embodiment, an electrode includes an active material-containing layer including single particles of an active material represented by a following formula (1) and a conductive agent. In a cumulative distribution of circularity of unit particles which include the single particles and the conductive agent, an average circularity at 25% in the cumulative distribution is 0.05 to 0.60, and an average circularity at 90% in the cumulative distribution is 0.3 to 0.85. A porosity of the active material-containing layer is 10% to 25%:

$$Li_aNi_{(1-b-c-d)}Co_bMn_cM_dO_2 \quad (1),$$

where $1 \le a \le 1.2$, $0 \le b \le 0.4$, $0 \le c \le 0.4$, $0 \le d \le 0.1$, and M is one or more elements selected from the group consisting of Fe, Cu, Ti, Mg, Al, W, Y, B, Mo, Nb, Zn, Sn, Zr, Ga, and V.

13 Claims, 4 Drawing Sheets

(51) Int. Cl.
*H01M 4/525* (2010.01)
*H01M 4/02* (2006.01)

(58) Field of Classification Search
USPC .................................. 429/523–534, 209–246
See application file for complete search history.

(56) References Cited

U.S. PATENT DOCUMENTS

| | | | | |
|---|---|---|---|---|
| 2020/0036005 | A1 | 1/2020 | Jito et al. | |
| 2020/0259217 | A1 | 8/2020 | Yura et al. | |
| 2021/0043918 | A1* | 2/2021 | Maeyama | H01M 10/052 |
| 2022/0029158 | A1* | 1/2022 | Takamori | H01M 4/505 |
| 2022/0285676 | A1* | 9/2022 | Kaneda | H01M 4/505 |

FOREIGN PATENT DOCUMENTS

| | | | |
|---|---|---|---|
| JP | 6600734 | B1 | 10/2019 |
| JP | 6868799 | B2 | 5/2021 |
| WO | 2018088320 | A1 | 5/2018 |
| WO | 2019093222 | A1 | 5/2019 |
| WO | 2019150559 | A1 | 8/2019 |
| WO | 2020110486 | A1 | 6/2020 |

OTHER PUBLICATIONS

Office Action issued on Oct. 8, 2024, in corresponding Japanese Application No. 2022-571379, 4 pages.
Office Action issued Apr. 9, 2024, in corresponding Japanese Patent Application No. 2022-571379, 12 pages.
Extended Search Report issued on Apr. 14, 2025, in corresponding European Application No. 21910599.6, 10 pages.

* cited by examiner

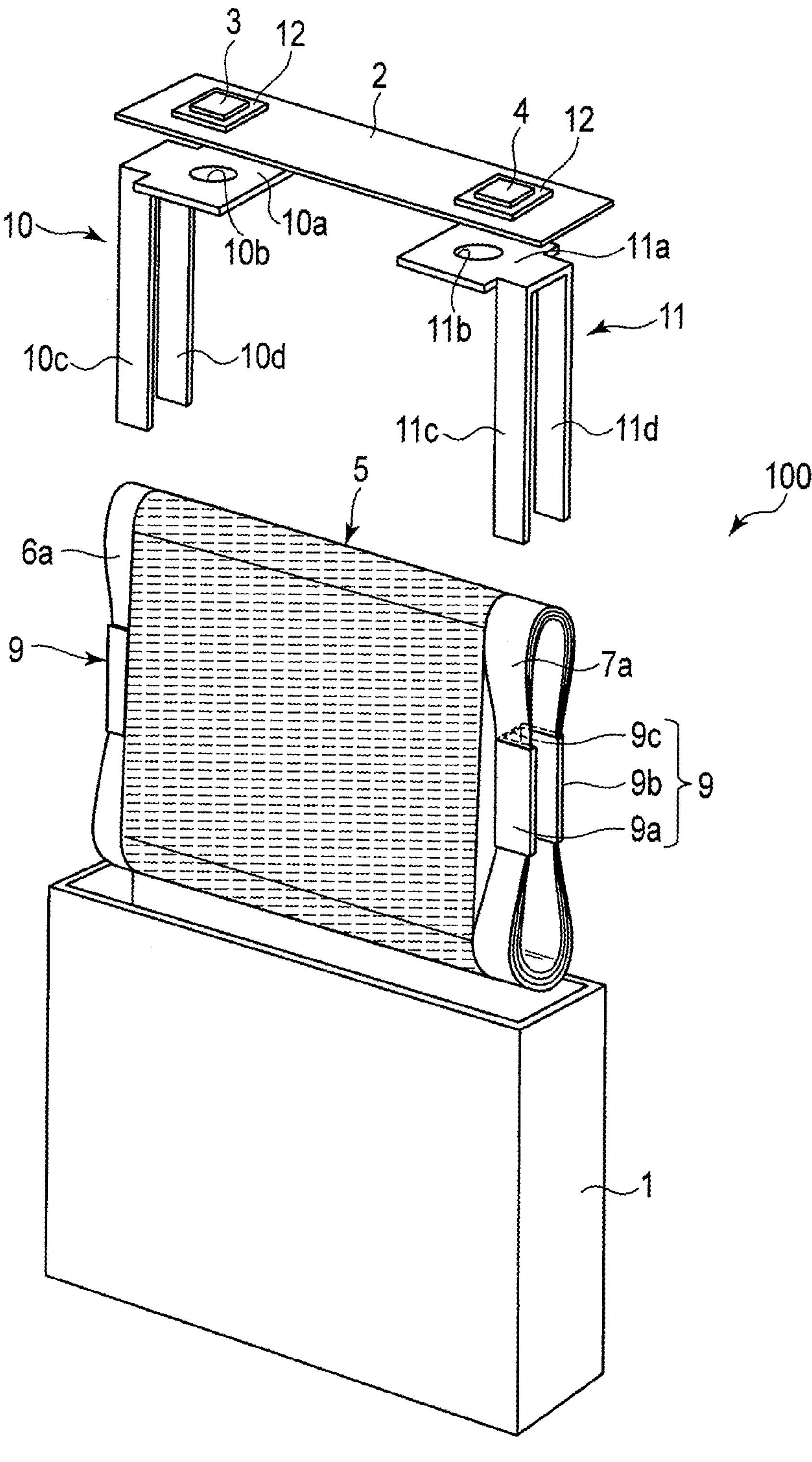
F I G. 2

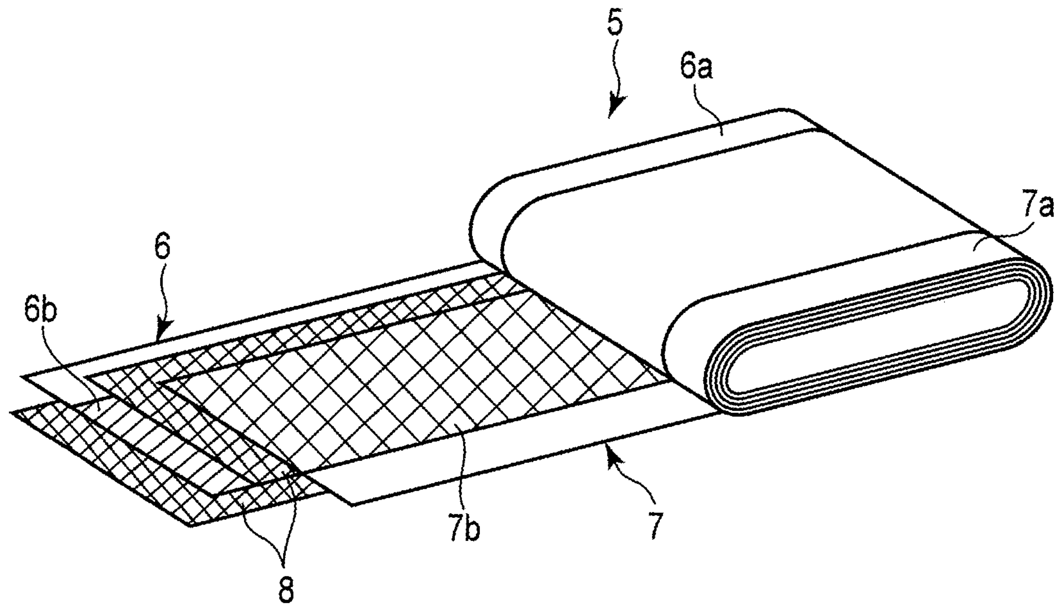
F I G. 3

ELECTRODE, NONAQUEOUS ELECTROLYTE BATTERY, AND BATTERY PACK

CROSS-REFERENCE TO RELATED APPLICATIONS

This application is a Continuation Application of PCT Application No. PCT/JP2021/046550, filed Dec. 16, 2021 and based upon and claiming the benefit of priority from PCT Application No. PCT/JP2020/048011, filed Dec. 22, 2020, the entire contents of all of which are incorporated herein by reference.

FIELD

Embodiments described herein relate generally to an electrode, a nonaqueous electrolyte battery, and a battery pack.

BACKGROUND

In recent years, with the widespread use of electric vehicles (EV) and electric buses (EV buses), an increased cruising distance per charge has been required. As lithium ion batteries serving as the power source of such vehicles, lithium ion batteries having a high energy density are strongly desired from the viewpoint of increasing the charge capacity per battery pack and reducing the weight. One of the ways to increase the energy density is to increase the capacity of the batteries. To increase the capacity of the batteries, an LNCM (lithium, nickel, manganese, cobalt) composite oxide having a large capacity per unit mass is promising to use as a positive electrode active material.

If the LNCM positive electrode active material is used up to a positive electrode potential as high as 4.2 V or more, at which a large capacity can be obtained, in order to increase the capacity of the batteries, an increase in resistance becomes significant due to, for example, gas generation associated with a side reaction between the electrolytic solution and the surfaces of the positive electrode active material particles. Thus, there is a drawback in that life characteristics during cycling, calendaring (preservation), and the like are significantly degraded. That is, it is difficult to achieve both suppressed resistance and a high capacity.

In addition, the conventional LNCM positive electrode active material is generally a polycrystalline system in which primary particles having a fine particle shape are aggregated to form secondary particles. Since these particles have a circularity close to 1, when filled in the positive electrode materials layer, there are many voids, so the positive electrode density does not increase. In a lithium ion secondary battery in which a positive electrode and a negative electrode must be housed in a limited space, it is difficult to increase the battery capacity due to an inability to increase the area of the positive electrode. Also, since the particles have a spherical shape with a circularity close to 1, the contacts between the particles and between the particles and a conductive agent are point contacts. As a consequence, the conductivity decreases due to expansion and contraction of the positive electrode active material caused by cycling, resulting in an increase in the AC resistance. The DC resistance also increases since, during cycling or calendaring (preservation) at a high potential, formation of a positive electrode film progresses in a polycrystalline system having a large specific surface area due to an oxidation reaction between a positive electrode and an electrolytic solution in a high SOC (state of charge) region.

BRIEF DESCRIPTION OF THE DRAWINGS

FIG. 2 is an exploded perspective view of an example of a nonaqueous electrolyte battery according to an embodiment.

FIG. 3 is a partially unfolded perspective view of an electrode group used in the nonaqueous electrolyte battery shown in FIG. 2.

DETAILED DESCRIPTION

Figure 1:
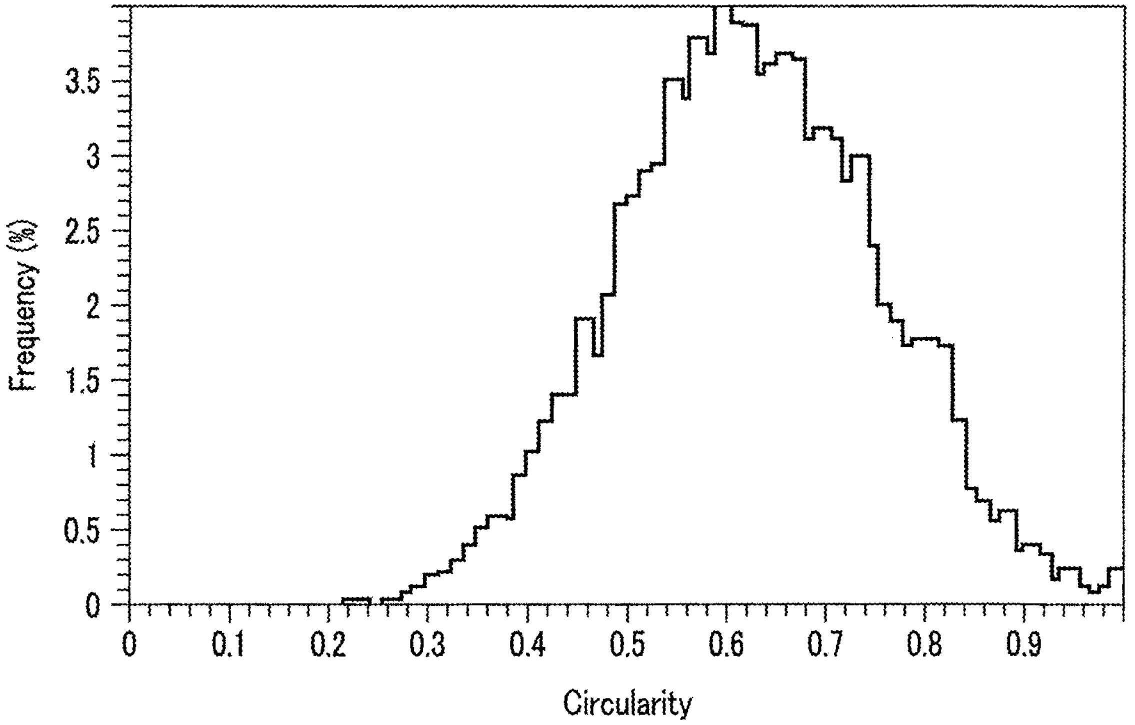
FIG. 1 is a graph showing a cumulative distribution of circularity relating to a positive electrode of an embodiment.

An object of the invention is to provide an electrode, a nonaqueous electrolyte battery, and a battery pack in which an increase in resistance during cycling or calendaring at a high potential is suppressed.

According to one embodiment, an electrode includes a current collector and an active material-containing layer formed on the current collector. The active material-containing layer includes single particles of an active material represented by a following formula (1) and a conductive agent. In a cumulative distribution of circularity of unit particles which include the single particles and the conductive agent, an average circularity at 25% in the cumulative distribution is 0.05 to 0.60, and an average circularity at 90% in the cumulative distribution is 0.3 to 0.85. A porosity of the active material-containing layer according to a mercury intrusion method is 10% to 25%.

$$Li_aNi_{(1-b-c-d)}Co_bMn_cM_dO_2 \quad (1)$$

wherein $1 \le a \le 1.2$, $0 \le b \le 0.4$, $0 \le c \le 0.4$, $0 \le d \le 0.1$, and M is one or more elements selected from the group consisting of Fe, Cu, Ti, Mg, Al, W, Y, B, Mo, Nb, Zn, Sn, Zr, Ga, and V.

According to another embodiment, a nonaqueous electrolyte battery including:

a positive electrode which is the electrode according to the embodiments;

a negative electrode; and a nonaqueous electrolyte.

According to another embodiment, a battery pack includes the nonaqueous electrolyte battery according to the embodiments.

In order to improve the high-output characteristics, it has been proposed that the particle size of the positive electrode active material which includes secondary particles be set to 1 μm to 10 μm and that the average circularity of the positive electrode active material be set to 0.05 to 0.6. However, when the positive electrode includes such secondary particles, cracks are generated at the particle boundaries of the positive electrode active material during electrode pressing, resulting in formation of a film on the cracked surface due to its side reaction with the electrolytic solution during charge and discharge cycling. Thus, an increase in resistance becomes significant. Also, in order to improve the volume capacity and the volume capacity retention rate, it has been proposed that the positive electrode active material include secondary particles and single particles, have an average particle size of 2 μm to 20 μm, have a first peak in a circularity range of 0.4 to 0.7, and have a second peak in a circularity range of 0.75 to 0.95. However, since such a particle structure includes secondary particles, an increase in resistance during cycling cannot be suppressed for the same reason as described above.

As a result of conducting intensive research, the inventors have discovered that the relationship between the circularity and the porosity of the active material-containing layer is important for suppressing an increase in resistance at a high potential. Even if the circularity of the active material-containing layer is defined, if the porosity thereof is not suitable for the circularity, the electrode density decreases, or the contact between particles cannot be sufficiently secured, resulting in an increase in the AC (alternating current) resistance during cycling or calendaring (storage, preservation) and an increase in the DC (direct current) resistance due to promotion of the oxidation reaction of the electrolytic solution at the distant particle surface at a high potential.

Optimizing the average circularity of the active material and the porosity of the positive electrode by using single particles with no particle boundary or particle cracking for the positive electrode active material can sufficiently maintain the contact between particles in the positive electrode and can suppress an increase in AC resistance as well as DC resistance during cycling and calendaring (storage, preservation), particularly at a high potential. That is, in the active material-containing layer which includes single particles of an active material represented by the formula (1) shown below, the average circularity, which is determined from the cumulative distribution obtained when the circularity is measured, is set to 0.05 to 0.60 at 25% in the cumulative distribution, and 0.3 to 0.85 at 90% in the cumulative distribution. In addition, the porosity of the active material-containing layer measured by a mercury intrusion method is set to 10% to 25%. As a result, it is possible to provide a positive electrode for a nonaqueous electrolyte battery in which an increase in both DC resistance and AC resistance is suppressed even during cycling and calendaring at a high potential.

$$Li_aNi_{(1-b-c-d)}Co_bMn_cM_dO_2 \quad (1)$$

wherein $1 \le a \le 1.2$, $0 \le b \le 0.4$, $0 \le c \le 0.4$, $0 \le d \le 0.1$, and M is one or more elements selected from the group consisting of Fe, Cu, Ti, Mg, Al, W, Y, B, Mo, Nb, Zn, Sn, Zr, Ga, and V.

First Embodiment

Hereinafter, an electrode of the first embodiment will be described in detail. For example, the electrode can be applied to a positive electrode or a negative electrode, or both a positive electrode and a negative electrode.

The electrode includes a current collector and an active material-containing layer formed on at least one surface of the current collector. If the current collector has, for example, a sheet shape, the active material-containing layer may be supported on at least one main surface of the current collector. The active material-containing layer includes single particles of an active material represented by the above formula (1). The active material-containing layer may include materials such as a conductive agent and a binder in addition to the active material.

A lithium-containing metal oxide represented by the above formula (1) has a large capacity per unit mass, and a large capacity can be obtained by using it up to a positive electrode potential of 4.2 V (vs. $Li/Li^+$) or more. The molar ratio a in the formula (1) may vary when the positive electrode has lithium ions inserted therein and extracted therefrom. A more preferred range is $1.05 \le a \le 1.15$.

By setting the molar ratio b in the formula (1) to $0<b \le 0.4$ and the molar ratio c in the formula (1) to $0<c \le 0.4$, the lithium-containing metal oxide further includes Co and Mn as transition metals in addition to Ni; thus, the capacity per unit mass increases. The molar ratio b and the molar ratio c are more preferably in the range of $0.05 \le b \le 0.2$ and $0.05 \le c \le 0.2$, respectively.

The molar ratio d of the element M in the formula (1) is more preferably in the range of $0.01 \le d \le 0.05$. By including the element M, the lattice strain is reduced and the Li ion diffusivity is improved in the case of, for example, M=Al. In the case of M=Mg, the bulk electron conductivity is improved, and the apparent discharge capacity is improved. The cycle stability under high voltage is also improved. In the case of M=Zr, the cycle characteristics are improved. In the case of M=Ti, the cycle characteristics are improved by suppressing the phase-change under high-voltage charge and discharge. In the case of M=Ga, the bulk electron conductivity is improved, and the cycle characteristics are improved.

The single particles of the active material represented by the formula (1) do not include a crystal grain boundary thereinside. Thus, the specific surface area of the single particles is small, and cracking of the particles due to expansion and contraction of the particles is less likely to occur. For this reason, the single particles are advantageous for suppressing an increase in AC resistance caused by the decrease in contact points or gas generation and suppressing an increase in DC resistance caused by the side reaction with the nonaqueous electrolyte at the particle interface. The average particle size (D50) of the single particles can be in the range of 1 μm to 8 μm. If the average particle size is less than 1 μm, it may be difficult to handle the particles. On the other hand, if the average particle size exceeds 8 μm, the input-output performance of the electrode may be lowered.

The circularity refers to the circularity of the unit particles constituting the active material-containing layer. The unit particles are the single unit obtained when the active material-containing layer is crushed under predetermined conditions. The crushing conditions are as described below. Many of the unit particles are single particles of the active material themselves, but may include an aggregate which is a composite formed by, for example, attaching or binding another material to the single particles of the active material. The unit particles obtained by crushing the active material-containing layer under the conditions described later reflect the shape of the single particles of the active material. Examples of the material included in the aggregate include a conductive agent and a binder.

The cumulative distribution of the circularity is a cumulative distribution based on the number of particles with the circularity of the particles arranged in ascending order. In the electrode of the embodiment, the average circularity at 25% in the cumulative distribution is 0.05 to 0.60, and the average circularity at 90% in the cumulative distribution is 0.3 to 0.85. The average circularity at 90% accumulation is greater than the average circularity at 25% accumulation. If the average circularity is close to 1, the particles will be close to a true circle, resulting in a decrease in the filling rate of the active material and a significant decrease in the battery capacity. If the average circularity is reduced, the shape of the particles will be close to an elliptical shape, a flat shape, a plate shape, a rectangular shape, or a fiber shape, and the unevenness of the surface will be large. As a result, the contact between the active materials and the contact between the active material and the conductive agent will be surface contact, not point contact, and the electrode density will be easily increased. The reason why the lower limit of the average circularity is set to 0.05 is that the circularity of the active materials that can be produced with the current technology is around 0.05. The upper limit of the average circularity at 25% accumulation is preferably 0.55. As a result, the effect of suppressing an increase in resistance during cycling at a high potential can be enhanced. The average circularity at 25% accumulation is more preferably in the range of 0.4 to 0.55. The effect of suppressing an increase in resistance during cycling at a high potential can be further increased. A still more preferred range is 0.5 to 0.55.

On the other hand, the upper limit of the average circularity at 90% accumulation is preferably 0.81. As a result, the effect of suppressing an increase in resistance during cycling at a high potential can be increased. The average circularity at 90% accumulation is more preferably in the range of 0.5 to 0.81. The effect of suppressing an increase in resistance during cycling at a high potential can be further increased. The average circularity at 90% accumulation is still more preferably in the range of 0.5 to 0.80. In addition, the lower limit of the average circularity at 90% accumulation is preferably 0.75, so that an increase in resistance during cycling at a high potential can be suppressed.

The average circularity at 10% accumulation is preferably 0.4 to 0.47. As a result, the effect of suppressing an increase in resistance during cycling at a high potential can be enhanced.

The average circularity at 75% accumulation is preferably 0.65 to 0.73. As a result, the effect of suppressing an increase in resistance during cycling at a high potential can be enhanced.

If the average circularity at 25% accumulation is 0.05 to 0.60 and the average circularity at 90% accumulation is 0.3 to 0.85, the average circularity at 10% accumulation is preferably 0.4 to 0.47 and the average circularity at 75% accumulation is preferably 0.65 to 0.73. As a result, suppression of the resistance can be expected in both cycling at a high potential and calendaring at a high potential.

Furthermore, the average circularity at 10% accumulation is preferably 0.4 to 0.47, the average circularity at 25% accumulation is preferably 0.5 to 0.55, the average circularity at 75% accumulation is preferably 0.65 to 0.73, and the average circularity at 90% accumulation is preferably 0.75 to 0.81. A cumulative distribution satisfying this condition may have a distribution which has a peak of the average circularity near 0.6 and is substantially symmetrical with respect to the peak, as shown in FIG. 1, for example. As a result, the electrode density, the contact between the particles, the contact between each particle and the electrolytic solution, and the like can be appropriate when the porosity is 10% to 25%, thus allowing for suppression of an increase in resistance in both cycling at a high potential and calendaring at a high potential.

The reason why the porosity of the active material-containing layer is set in the range of 10% to 25% will be described. In order to prevent liquid depletion due to the consumption caused by a reaction between the active material and the electrolytic solution, it is desirable to secure a porosity of about 30%. However, if the porosity of the electrode which includes the above-described single particles and which has an average circularity at 25% accumulation and 90% accumulation as specified above exceeds 25%, the density becomes low and the contact between the particles cannot be sufficiently secured. Thus, the AC resistance increases due to expansion and contraction caused by cycling, and the DC resistance also increases due to promotion of the oxidation reaction of the electrolytic solution at the distant particle surface during cycling or calendaring at a high potential. As a result, the battery capacity is greatly reduced. In order to suppress an increase in resistance at a high potential, the porosity is set to 25% or less. Since the reaction with the electrolytic solution is suppressed, the consumption of the electrolytic solution is small even with such a small porosity, leading to prevention of liquid depletion. However, if the porosity is less than 10%, the ability of the electrode to absorb the electrolytic solution is degraded, resulting in a large increase in resistance and deterioration of cycling. The porosity is more preferably in the range of 20% to 24%.

The conductive agent can enhance current collecting performance and suppress the contact resistance between the active material and the current collector. The conductive agent preferably includes a carbon material. Examples of the carbon material include acetylene black, ketjen black, furnace black, graphite, carbon nanotubes, and carbon nanofibers. The active material-containing layer may contain one, two, or more of these carbon materials.

The conductive agent has, for example, a particle shape or a fiber shape. The average particle size of the conductive agent particles is preferably 20 nm to 100 nm. The proportion of the conductive agent in the active material-containing layer is, for example, preferably 3% by mass to 20% by mass.

Examples of the binder include polytetrafluoro ethylene (PTFE), polyvinylidene fluoride (PVdF), and fluorine rubber. One or more than one type of binder may be used. The proportion of the binder in the active material-containing layer is preferably 1% by mass to 1.8% by mass.

The density of the active material-containing layer is preferably 3.2 $g/cm^3$ to 3.8 $g/cm^3$.

For example, a metal foil or an alloy foil may be used as the current collector. Examples of the metal foil include an aluminum foil, a stainless steel foil, and a nickel foil. Examples of the alloy foil include an aluminum alloy, a copper alloy, and a nickel alloy.

The electrode is prepared, for example, by the following method. An active material, a conductive agent, and a binder are mixed with a solvent (e.g., N-methylpyrrolidone (NMP)) to prepare a slurry. The obtained slurry is applied to a current collector, dried, and then pressed to obtain an electrode. The voids in the active material-containing layer can be adjusted by pressing the active material-containing layer with a load corresponding to the composition of the active material-containing layer. If necessary, the step of cutting the active material-containing layer with the current collector into a predetermined width may be performed before or after the pressing.

The cumulative distribution of the circularity of the unit particles including the single particles and the conductive agent can be set to a target distribution by, for example, adjusting the conditions of the step of preparing a slurry (also referred to as a "paste"). The preparation step is performed, for example, by the following method. An active material and a conductive agent are mixed to form a composite (compound) of the active material and the conductive agent. The obtained composite and a binder are dispersed in a solvent and mixed together using a planetary mixer. Next, the mixture is mixed together using a bead mill, whereby a slurry (paste) is prepared. The target cumulative distribution can be obtained by comprehensively considering the shapes of the active material and the conductive agent, the affinity between the active material and the solvent, the mixing conditions, and the like. The affinity between the active material and the solvent can be affected by, for example, the composition of the active material, the distance between the active material, the conductive agent, and the binder, and the like. If the affinity between the active material and the solvent is high, the active material is likely to be uniformly dispersed in the slurry (paste). If the affinity between the active material and the solvent is different, different cumulative distributions can be obtained even if the subsequent mixing conditions are the same. Also, if the bead rotation speed in the bead mill is high, the circularity of the unit particles tends to be close to 1. If the solid concentration of the slurry (paste) at the time of mixing is large, a shear force is easily applied to the objects to be processed (i.e., the active material, the conductive agent, etc.). Since adjusting the affinity between the active material and the solvent and the solid concentration can make the dispersibility of the active material and the conductive agent appropriate without applying a large shear force, the circularity of the unit particles can be easily reduced.

Hereinafter, methods of measuring the circularity, the porosity, the average particle size, and the composition of the active material are described. First, a method of removing an electrode from a battery will be described.

First, a battery to be measured is prepared. The battery to be measured has a discharge capacity of 80% or more of the rated capacity. That is, a battery which has deteriorated excessively is not used for measurement.

Next, the prepared battery is discharged until the open-circuit voltage reaches 2.0 to 2.2 V. The discharged battery is then transferred into an argon-filled glove box with an internal atmosphere having a dew point of −70° C. The battery is opened in such a glove box. An electrode group is removed from the opened battery. If the electrode group removed includes a positive electrode lead and a negative electrode lead, the positive electrode lead and the negative electrode lead are cut with attention paid so as not to short-circuit the positive electrode and the negative electrode.

Next, the electrode group is disassembled into the positive electrode, negative electrode, and separator. The electrode (e.g., positive electrode) thus obtained is washed using diethyl carbonate as a solvent. In this washing step, a component obtained by the disassembly is completely immersed in the diethyl carbonate solvent and let stand in this state for 60 minutes.

After the washing, the electrode is subjected to vacuum drying. When performing the vacuum drying, the pressure is reduced from atmospheric pressure to −97 kpa or more in a 25° C. environment, and this state is maintained for 10 minutes. The electrode removed in this manner is subjected to a measurement, which is performed by the methods described below.

Method of Measuring Circularity

The apparatus used is, for example, a flow-type image analysis particle size and shape measuring apparatus (Particle Insight manufactured by SHIMADZU). The active material-containing layer is scraped from the electrode with a spatula to obtain a peeled powder. The peeled powder is crushed in an agate mortar or the like and collected in a 50 ml beaker, and about 10 ml of ethanol is added thereto. The resultant is then subjected to a dispersion treatment for 1 minute in an ultrasonic bath at 200 W and used as a measurement sample. About 1 g of the measurement sample is put into a beaker containing 60 ml of pure water, and measurement is performed while stirring them with a stirrer. The speed of the stirrer in the beaker is set to 350 rpm. The circulation flow rate of the sample solution in the apparatus is set so that the rotation speed of the pump is 70 rpm (circulation flow rate: about 100 ml/min). The circularity obtained by analyzing the image of about 9000 particles is plotted in a cumulative distribution with respect to the number of particles, and the average circularity in a given cumulative distribution is tallied. For example, the average circularity at 25% accumulation is a value obtained by dividing the total circularity up to 25% in the cumulative distribution by the number of particles accumulated up to 25% in the cumulative distribution. The average circularity at 10% accumulation, 75% accumulation, and 90% accumulation is also obtained in the same manner. An example of the cumulative distribution is shown in FIG. 1. In FIG. 1, the horizontal axis represents the circularity of the particles, and the vertical axis represents the frequency (%). The frequency (%) is a ratio of the number of particles at each circularity to the total number of particles.

Porosity

A plurality of strip-shaped measurement samples are cut out from the electrode. The size of each of the measurement samples is, for example, 1.25 cm×2.50 cm. The mass of each of the cut measurement samples is then measured. 16 measurement samples are loaded into the cell of the measurement apparatus. These measurement samples are measured under the conditions of an initial pressure of about 10 kPa (about 1.5 psia, equivalent to a pore diameter of about 120 μm) and a maximum pressure of 414 MPa (about 59986 psia, equivalent to a pore diameter of about 0.003 μm) to obtain a pore distribution curve of the electrode. For example, a micromeritics pore distribution analyzer AutoPore 9520 manufactured by SHIMADZU is used as the measurement apparatus.

Subsequently, the active material-containing layer is peeled off, by using, for example, a spatula, from another measurement sample cut out from the same electrode, and a current collector piece is obtained. Next, the mass of the current collector piece is measured. Then, the mass of the active material-containing layer included in the measurement sample is obtained by subtracting the mass of the current collector piece from the mass of the measurement sample. Thereafter, the pore distribution curve of the electrode obtained by the above method is recalculated and converted into a pore distribution curve of the active material-containing layer. In this manner, the pore distribution curve of the active material-containing layer is obtained. The pore volume per 1 g mass of the active material-containing layer can be determined from the pore distribution and the mass of the active material-containing layer obtained as described above. The porosity is obtained by dividing the obtained pore volume (mL/g) by the volume per 1 g mass of the active material-containing layer.

Average Particle Size

The active material-containing layer is peeled off from the electrode using, for example, a spatula, is ultrasonically pulverized, and is measured with a particle size distribution analyzer (e.g., a laser diffraction particle size distribution analyzer SALD-2300 (manufactured by SHIMADZU)).

Composition of Active Material

The composition of the active material is obtained by measuring, with fluorescent X-rays (XRF), the surface of the electrode removed from the battery by the above-described method.

The electrode according to the first embodiment described above includes the active material-containing layer which includes single particles of an active material represented by the above formula (1). The active material-containing layer has an average circularity of 0.05 to 0.60 at 25% accumulation and an average circularity of 0.3 to 0.85 at 90% accumulation in the cumulative distribution of the circularity. Also, the porosity of the active material-containing layer measured by a mercury intrusion method is 10% to 25%. According to the electrode of the embodiment, it is possible to suppress an increase in both the AC resistance and the DC resistance even during cycling or calendaring at a high potential.

Second Embodiment

According to a second embodiment, a nonaqueous electrolyte battery is provided. The nonaqueous electrolyte battery includes a positive electrode, a negative electrode, and a nonaqueous electrolyte. The electrode according to the first embodiment can be used as the positive electrode.

Next, the nonaqueous electrolyte battery according to the second embodiment will be described in detail. The nonaqueous electrolyte battery according to the second embodiment may include an electrode group. The electrode group includes a positive electrode and a negative electrode. The electrode group may further include a separator positioned between the positive electrode and the negative electrode. The positive electrode may include a positive electrode current-collecting tab electrically connected to the electrode group. The negative electrode may include a negative electrode current-collecting tab electrically connected to the electrode group. The nonaqueous electrolyte battery according to the second embodiment may further include a container member. The electrode group may be housed in the container member. The container member may further contain a nonaqueous electrolyte. The electrode group housed in the container member may be impregnated with the nonaqueous electrolyte. The nonaqueous electrolyte battery according to the second embodiment may further include a positive electrode terminal electrically connected to the container member and a negative electrode terminal electrically connected to the container member. The positive electrode terminal may be electrically connected to the positive electrode current-collecting tab of the positive electrode. The negative electrode terminal may be electrically connected to the negative electrode current-collecting tab of the negative electrode.

Hereinafter, the negative electrode, the positive electrode, the electrolyte, the separator, the container member, the negative electrode terminal, and the positive electrode terminal will be described in detail.

(1) Positive Electrode

The above-described electrode according to the first embodiment may be used as the positive electrode.

(2) Negative Electrode

The negative electrode includes a negative electrode current collector and a negative electrode active material-containing layer formed on the negative electrode current collector. The negative electrode active material-containing layer may contain a conductive agent and a binder in addition to the negative electrode active material.

The negative electrode active material, the conductive agent, the binder, and the negative electrode current collector will be described below.

<Negative Electrode Active Material>

The negative electrode active material preferably includes a compound capable of having lithium ions inserted thereinto and extracted therefrom at a potential of 0.4 V (vs. $Li/Li^+$) or more. The nonaqueous electrolyte battery according to the second embodiment which includes such a negative electrode can suppress the precipitation of lithium caused by charge and discharge. Thus, such a nonaqueous electrolyte battery excels more in rapid-charge-discharge characteristics. Examples of the negative electrode active material include: spinel-type lithium titanium oxides represented by $Li_{4+x}Ti_5O_{12}$ (x varies in the range of $-1 \leq x \leq 3$ due to charge-discharge reaction); ramsdellite-type lithium titanium oxides represented by $Li_{2+x}Ti_3O_7$ (x varies in the range of $-1 \leq x \leq 3$ due to charge-discharge reaction); niobium-titanium composite oxides represented by $Nb_2TiO_7$; and metal composite oxides containing Ti and at least one selected from the group consisting of P, V, Sn, Cu, Ni, and Fe. Examples of the metal composite oxides containing Ti and at least one selected from the group consisting of P, V, Sn, Cu, Ni, and Fe are $TiO_2$—$P_2O_5$, $TiO_2$—$V_2O_5$, $TiO_2$—$P_2O_5$—$SnO_2$, and $TiO_2$—$P_2O_5$-MO (M is at least one selected from the group consisting of Cu, Ni, and Fe). These metal composite oxides are changed into lithium-titanium composite oxides when lithium is inserted thereinto by charging. Among the lithium-titanium composite oxides, spinel-type lithium titanium oxides are preferred because of their excellent cycle characteristics.

The negative electrode active material may include, for example, a carbonaceous material or a metal compound. Examples of the carbonaceous material include natural graphite, artificial graphite, coke, vapor-grown carbon fibers, mesophase pitch-based carbon fibers, spherical carbon, and resin-fired carbon. More preferred examples of the carbonaceous material are vapor-grown carbon fibers, mesophase pitch-based carbon fibers, and spherical carbon. The lattice spacing $d_{002}$ of a plane (002) by X-ray diffraction in the carbonaceous material is preferably 0.34 nm or less.

A metal sulfide or a metal nitride can be used as the metal compound. A titanium sulfide such as $TiS_2$, a molybdenum sulfide such as $MoS_2$, or an iron sulfide such as FeS, $FeS_2$, or $Li_xFeS_2$ may be used as the metal sulfide. A lithium cobalt nitride (e.g., $Li_sCo_tN$, $0<s<4$, $0<t<0.5$) can be used as the metal nitride.

<Conductive Agent>

Examples of the conductive agent include carbonaceous materials such as acetylene black, carbon black, and graphite.

<Binder>

Examples of the binder include polytetrafluoro ethylene (PTFE), polyvinylidene fluoride (PVdF), fluorine rubber, and styrene-butadiene rubber.

<Negative Electrode Current Collector>

If the negative electrode active material is a material capable of having lithium ions inserted thereinto and extracted therefrom, a material that is electrochemically stable at the lithium-ion insertion-extraction potential of the negative electrode active material can be used as the negative electrode current collector. The negative electrode current collector is preferably a metal foil made of at least one selected from copper, nickel, stainless steel, and aluminum, or an alloy foil made of an aluminum alloy containing at least one element selected from Mg, Ti, Zn, Mn, Fe, Cu, and Si. The negative electrode current collector may have various shapes depending on the use of the battery.

<Production Method>

The negative electrode can be produced, for example, by the following method. First, a negative electrode active material, a binder, and, if necessary, a conductive agent are suspended in a general-purpose solvent such as N-methylpyrrolidone to prepare a slurry for producing a negative electrode. The obtained slurry is applied onto the negative electrode current collector. The applied slurry is dried and the dried coating is pressed, whereby a negative electrode which includes the negative electrode current collector and a negative electrode active material-containing layer formed on the negative electrode current collector can be obtained.

(3) Separator

The separator is not particularly limited as long as it has insulating properties. A porous film or nonwoven fabric made of a polymer such as polyolefin, cellulose, polyethylene terephthalate, or vinylon can be used as the separator. One or more than one kind of material in combination may be used as the material of the separator.

The separator may have a thickness of 5 μm to 20 μm.

(4) Electrode Group

The electrode group may have a wound structure in which a stack of a positive electrode, a separator, and a negative electrode is wound, a stacked structure in which the positive electrode and the negative electrode are alternately stacked with a separator interposed therebetween, or other structures.

(5) Nonaqueous Electrolyte

The nonaqueous electrolyte includes a nonaqueous solvent and an electrolyte salt dissolved in the nonaqueous solvent. Examples of the nonaqueous electrolyte include nonaqueous electrolytic solutions and gelled nonaqueous electrolytes.

Examples of the electrolyte salt include lithium salts such as $LiPF_6$, $LiBF_4$, $Li(CF_3SO_2)_2N$ (lithium bis(trifluoro methanesulfonyl)imide; commonly known as LiTFSI), $LiCF_3SO_3$ (commonly known as LiTFS), $Li(C_2F_5SO_2)_2N$ (lithium bis(pentafluoro ethanesulfonyl)imide; commonly known as LiBETI), $LiClO_4$, $LiAsF_6$, $LiSbF_6$, lithium bis (oxalate)borate {$LiB(C_2O_4)_2$, commonly known as LiBOB}, and lithium difluoro(trifluoro-2-oxide-2-trifluoro-methylpropionate(2-)-0,0)borate {$LiBF_2OCOOC(CF_3)_2$, commonly known as $LiBF_2$(HHIB)}. These electrolyte salts may be used alone or in the form of a mixture of two or more thereof. $LiPF_6$, $LiBF_4$, or a mixture thereof is preferably used as the electrolyte salt.

The concentration of the electrolyte salt in the nonaqueous electrolyte is preferably in the range of 1 mol/L to 3 mol/L. If the concentration of the electrolyte salt is within this range, it is possible to further improve the performance for using a high load current, while suppressing the influence of an increase in viscosity due to an increase in the concentration of the electrolyte salt in the nonaqueous electrolyte.

The nonaqueous solvent is not particularly limited. For example, a cyclic carbonate such as propylene carbonate (PC) or ethylene carbonate (EC), a chain carbonate such as diethyl carbonate (DEC), dimethyl carbonate (DMC), methyl ethyl carbonate (MEC), or dipropyl carbonate (DPC), 1,2-dimethoxyethane (DME), γ-butyrolactone (GBL), tetrahydrofuran (THF), 2-methyltetrahydrofuran (2-MeHF), 1,3-dioxolane, sulfolane, or acetonitrile (AN) is used as the nonaqueous solvent. These solvents may be used alone or in the form of a mixture of two or more thereof. As the nonaqueous solvent, a nonaqueous solvent including a cyclic carbonate and/or a chain carbonate is preferred.

(6) Container Member

For example, a laminated film or a metallic container is used as the container member. Each of the thickness of the laminated film and the thickness of the metallic container may be 0.5 mm or less. A resin container made of polyolefin resin, polyvinyl chloride resin, polystyrene resin, acrylic resin, phenol resin, polyphenylene resin, fluorine resin, or the like may also be used as the container member.

Examples of the shape of the container member, that is, the shape of the battery, include a flat shape (thin shape), a rectangular shape, a cylindrical shape, a coin shape, and a button shape. For example, the battery can be applied to both a small-sized battery mounted on a portable electronic device or the like, and a large-sized battery mounted on a two-wheel or four-wheel vehicle or the like.

For example, a multilayer film including resin layers and a metal layer interposed between the resin layers is used as the laminated film. The metal layer is preferably an aluminum foil or an aluminum alloy foil for weight reduction. For example, a polymeric material such as polypropylene (PP), polyethylene (PE), nylon, or polyethylene terephthalate (PET) can be used as the resin layer. The laminated film can be formed into the shape of the container member by heat-sealing.

The metallic container is made of aluminum or an aluminum alloy. The aluminum alloy preferably contains an element such as magnesium, zinc, or silicon. If the alloy contains transition metals such as iron, copper, nickel, and chromium, the content thereof is preferably 100 ppm or less.

Next, an example of the nonaqueous electrolyte battery according to the second embodiment will be described in more detail with reference to the drawings.

FIG. 2 is an exploded perspective view of an example of a nonaqueous electrolyte battery of the embodiment. The battery shown in FIG. 2 is a sealed prismatic nonaqueous electrolyte battery. The nonaqueous electrolyte battery shown in FIG. 2 includes a container can 1, a lid 2, a positive electrode external terminal 3, a negative electrode external terminal 4, and an electrode group 5. The container can 1 and the lid 2 constitute the container member. The container can 1 has a bottomed rectangular tube shape and is made of a metal such as aluminum, an aluminum alloy, iron, or stainless steel.

FIG. 3 is a partially unfolded perspective view of an electrode group used in the nonaqueous electrolyte battery shown in FIG. 2. As shown in FIG. 3, the flat electrode group 5 is formed by winding the positive electrode 6 and the negative electrode 7 in a flat shape with the separator 8 interposed therebetween. The positive electrode 6 includes, for example, a strip-shaped positive electrode current collector made of a metal foil, a positive electrode current-collecting tab 6*a* with one end parallel to a long side of the positive electrode current collector, and a positive electrode material layer (positive electrode active material-containing layer) 6*b* formed on the positive electrode current collector excluding at least the portion where the positive electrode current-collecting tab 6*a* is located. On the other hand, the negative electrode 7 includes, for example, a strip-shaped negative electrode current collector made of a metal foil, a negative electrode current-collecting tab 7*a* with one end parallel to a long side of the negative electrode current collector, and a negative electrode material layer (negative electrode active material-containing layer) 7*b* formed on the negative electrode current collector excluding at least the portion where the negative electrode current-collecting tab 7*a* is located.

The positive electrode 6, the separator 8, and the negative electrode 7 configured as described above are wound with the positions of the positive electrode 6 and the negative electrode 7 shifted with respect to each other, so that the positive electrode current-collecting tab 6*a* protrudes from the separator 8 in the winding axis direction of the electrode group and the negative electrode current-collecting tab 7*a* protrudes from the separator 8 in the opposite direction. With such a winding manner, the electrode group 5 is configured so that the spirally wound positive electrode current-collecting tab 6*a* protrudes from one end face, and the spirally wound negative electrode current-collecting tab 7*a* protrudes from the other end face, as shown in FIG. 3. The electrode group 5 is impregnated with a nonaqueous electrolyte (not shown).

As shown in FIG. 2, each of the positive electrode current-collecting tab 6*a* and the negative electrode current-collecting tab 7*a* is divided into two bundles with the vicinity of the winding center of the electrode group set as a boundary. A conductive holding member 9 has substantially U-shaped first and second holding parts 9*a* and 9*b* and a connecting part 9*c* for electrically connecting the first holding part 9*a* and the second holding part 9*b*. In each of the positive and negative electrode current-collecting tabs 6*a* and 7*a*, one of the bundles is held by the first holding part 9*a*, and the other of the bundles is held by the second holding part 9*b*.

The positive electrode lead 10 includes a substantially rectangular support plate 10*a*, a through-hole 10*b* opened in the support plate 10*a*, and strip-shaped current-collecting parts 10*c* and 10*d* branched from the support plate 10*a* and extending downward. On the other hand, the negative electrode lead 11 includes a substantially rectangular support plate 11*a*, a through-hole 11*b* opened in the support plate 11*a*, and strip-shaped current-collecting parts 11*c* and 11*d* branched from the support plate 11*a* and extending downward.

The positive electrode lead 10 holds the holding member 9 between the current-collecting parts 10*c* and 10*d*. The current-collecting part 10*c* is disposed on the first holding part 9*a* of the holding member 9. The current-collecting part 10*d* is disposed on the second holding part 9*b*. The current-collecting parts 10*c* and 10*d*, the first and second holding parts 9*a* and 9*b*, and the positive electrode current-collecting tab 6*a* are joined by, for example, ultrasonic welding. Thus, the positive electrode 6 of the electrode group 5 and the positive electrode lead 10 are electrically connected to each other via the positive electrode current-collecting tab 6*a*.

The negative electrode lead 11 holds the holding member 9 between the current-collecting parts 11*c* and 11*d*. The current-collecting part 11*c* is disposed on the first holding part 9*a* of the holding member 9. On the other hand, the current-collecting part 11*d* is disposed on the second holding part 9*b*. The current-collecting parts 11*c* and 11*d*, the first and second holding parts 9*a* and 9*b*, and the negative electrode current-collecting tab 7*a* are joined by, for example, ultrasonic welding. Thus, the negative electrode 7 of the electrode group 5 and the negative electrode lead 11 are electrically connected to each other via the negative electrode current-collecting tab 7*a*.

The materials of the positive and negative electrode leads 10 and 11 and the holding member 9 are not particularly specified, but are preferably the same as the materials of the positive and negative electrode external terminals 3 and 4. For example, aluminum or an aluminum alloy is used for the positive electrode external terminal 3, and aluminum, an aluminum alloy, copper, nickel, nickel-plated iron, or the like is used for the negative electrode external terminal 4. For example, if the materials of the external terminals are aluminum or an aluminum alloy, the materials of the leads are preferably aluminum or an aluminum alloy. If the external terminals are made of copper, the materials of the leads are preferably copper or the like.

The rectangular plate-shaped lid 2 is seam-welded to the opening of the outer can 1 by, for example, a laser. The lid 2 is formed of, for example, a metal such as aluminum, an aluminum alloy, iron, or stainless steel. The lid 2 and the outer can 1 are preferably formed of the same kind of metal. The positive electrode external terminal 3 is electrically connected to the support plate 10*a* of the positive electrode lead 10, and the negative electrode external terminal 4 is electrically connected to the support plate 11*a* of the negative electrode lead 11. The insulating gasket 12 is disposed between the lid 2 and the positive and negative electrode external terminals 3 and 4, and electrically insulates the positive and negative electrode external terminals 3 and 4 from the lid 2. The insulating gasket 12 is preferably a resin molded product.

The battery according to the second embodiment includes the electrode according to the first embodiment. Therefore, the battery according to the second embodiment can suppress an increase in AC resistance and DC resistance even during cycling or calendaring at a high potential.

Third Embodiment

According to a third embodiment, a battery pack including a battery is provided. The battery according to the second embodiment is used as the battery. One or more single batteries may be included in the battery pack.

A plurality of batteries may be electrically connected in series, in parallel, or in a combination of in-series connection and in-parallel connection, to constitute a battery module. The battery pack may include a plurality of battery modules.

The battery pack may further include a protective circuit. The protective circuit functions to control charge and discharge of the battery. Alternatively, a circuit included in devices (such as electronic devices and automobiles) which use a battery pack as a power source may be used as the protective circuit of the battery pack.

The battery pack may further include an external power distribution terminal. The external power distribution terminal is configured to output current from the battery to the outside and to input current into the battery. In other words, when using the battery pack as a power source, current is supplied to the outside through the external power distribution terminal. When charging the battery pack, charge current (including regenerative energy of a motive force of an automobile) is supplied to the battery pack through the external power distribution terminal.

Figure 4:
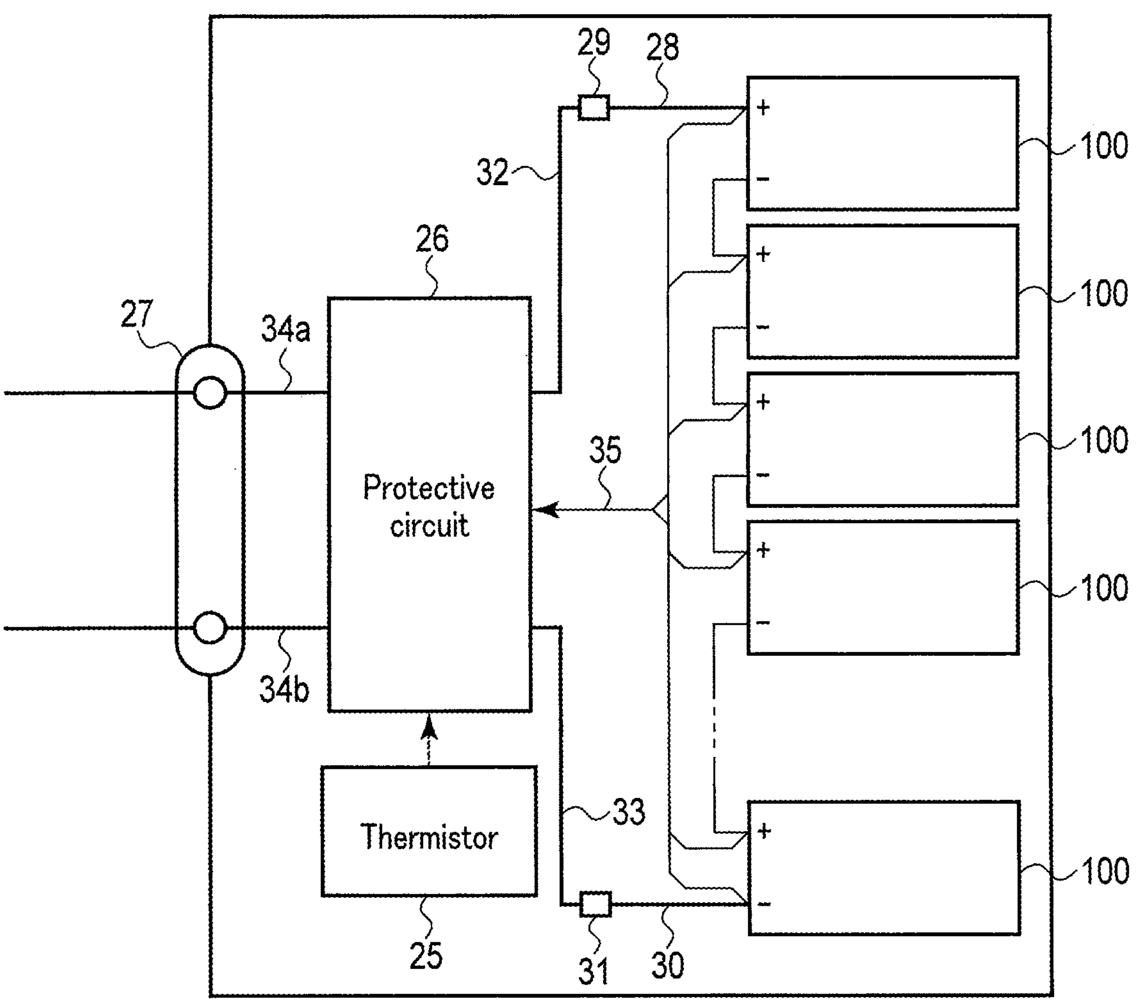
FIG. 4 is a block diagram showing an example of an electric circuit of a battery pack according to an embodiment.

Next, an example of the battery pack according to the third embodiment will be described with reference to the drawings. FIG. 4 is a block diagram showing an example of an electric circuit of the battery pack according to the embodiment.

The battery pack shown in FIG. 4 includes a plurality of flat batteries 100 having the structure shown in FIGS. 2 and 3. These single batteries 100 are electrically connected to each other in series as shown in FIG. 4.

As shown in FIG. 4, a thermistor 25, a protective circuit 26, and a power distribution terminal 27 to an external device are mounted on the printed wiring board.

A positive electrode-side lead 28 is connected to a positive electrode external terminal of a single battery 100 of the battery module, and the positive electrode-side lead 28 is electrically connected to a positive electrode-side connector 29 of the printed wiring board. A negative electrode-side lead 30 is connected to a negative electrode external terminal of another single battery 100 of the battery module, and the negative electrode-side lead 30 is electrically connected to a negative electrode-side connector 31 of the printed wiring board. These connectors 29 and 31 are electrically connected to the protective circuit 26 through wires 32 and 33 formed on the printed wiring board.

The thermistor 25 detects the temperature of each of the single batteries 100, and the detection signals are transmitted to the protective circuit 26. The protective circuit 26 can shut off a plus-side wire 34*a* and a minus-side wire 34*b* between the protective circuit 26 and the power distribution terminal 27 to an external device under a predetermined condition. An example of the predetermined condition is the case where a signal indicating that the temperature of the single battery 100 is equal to or higher than a predetermined temperature is received from the thermistor 25. Another example of the predetermined condition is the case where overcharge, over-discharge, overcurrent, or the like of the single battery 100 is detected. The detection of the overcharge or the like is performed for the individual single batteries 100 or the single batteries 100 as a whole. In the case of detecting the individual single batteries 100, a battery voltage may be detected, or a positive electrode potential or a negative electrode potential may be detected. In the latter case, a lithium electrode used as a reference electrode is inserted into each single battery 100. In the battery pack shown in FIG. 4, a wire 35 for voltage detection is connected to each of the single batteries 100, and a detection signal is transmitted to the protective circuit 26 through the wire 35.

Although the battery pack shown in FIG. 4 has a configuration in which the single batteries 100 are connected in series, the battery pack according to the third embodiment may be configured so that the single batteries 100 are connected in parallel to increase the battery capacity. Alternatively, the battery pack according to the third embodiment may include a plurality of single batteries 100 connected in a combination of in-series connection and in-parallel connection. Assembled battery packs may also be connected in series or in parallel.

Although the battery pack shown in FIG. 4 includes a plurality of single batteries 100, the battery pack according to the third embodiment may include one single battery 100.

The form of the battery pack can be appropriately changed depending on the applications. The battery pack is preferably used in applications where cycle characteristics with large current characteristics are desired. Specifically, the battery pack is used as a power source of digital cameras or a battery of vehicles such as two- or four-wheeled hybrid electric automobiles, two- or four-wheeled electric automobiles, and electric bicycles. The battery pack is particularly suitable for use in the on-vehicle applications.

In an automobile including the battery pack according to the embodiment, the battery pack, for example, is configured to recover regenerative energy of the motive force of the automobile.

The battery pack of the third embodiment detailed above includes the battery of the second embodiment. Therefore, the battery pack according to the third embodiment can suppress an increase in AC resistance and DC resistance even during cycling or calendaring at a high potential.

EXAMPLES

<Production of Nonaqueous Electrolyte Battery>

Example 1

(Preparation of Positive Electrode)

A lithium-containing nickel cobalt manganese composite oxide $LiNi_{0.8}Co_{0.1}Mn_{0.1}O_2$ formed of single particles was prepared as an active material. The average particle size (D50) of the prepared active material was 4 μm. Acetylene black as a conductive aid (conductive agent) and polyvinylidene fluoride as a binder were prepared. The active material, the conductive agent, and the binder were dissolved or mixed in N-methylpyrrolidone (NMP) at a weight ratio of 93:5:2 to prepare a paste.

A specific method of preparing a paste is described below. The active material and the conductive agent were combined using a Henschel mixer to form a composite (compound) of the active material and the conductive agent. The obtained composite and the binder were dispersed in NMP and mixed together using a planetary mixer having a capacity of 20 L. At this time, each material was gradually added to NMP in order to avoid a rapid increase in viscosity. The mixing was performed under the mixing condition of a solid concentration (non-volatile content (NV)) of 78.5%. Then, the resultant mixture was transferred to a bead mill having a capacity of 2 L, followed by stirring at a bead rotation speed of 800 rpm, whereby a paste was prepared.

The paste-form dispersion liquid was uniformly applied as a positive electrode coating liquid to both front and back surfaces of a strip-shaped current collector made of an aluminum foil. The coating of the positive electrode coating liquid was dried to form a positive electrode active material-containing layer. Press molding of the dried strip-shaped body was performed under the following conditions. A press roll made of a steel roll plated with hard chromium and having a press-roll diameter of 0350 mm was used, and the press load was set to about 8 kN/cm. The rolled electrode was cut into a predetermined size. A current-collecting tab was welded thereto to obtain a positive electrode.

(Preparation of Negative Electrode)

A spinel-type lithium titanium oxide represented by $Li_4Ti_5O_{12}$ as a negative electrode active material, graphite as a conductive agent, and polyvinylidene fluoride as a binder were prepared. The negative electrode active material, the conductive agent, and the binder were dissolved or mixed in NMP at a weight ratio of 94:4:2 to prepare a paste. This paste was uniformly applied as a negative electrode coating liquid to both front and back surfaces of a strip-shaped negative electrode current collector made of an aluminum foil. The negative electrode coating liquid was dried to form a negative electrode active material-containing layer. The dried strip-shaped body was press-molded and then cut into a predetermined size. The thickness of the electrode was adjusted to 130 μm. A current-collecting tab was welded thereto to obtain a negative electrode.

(Preparation of Electrode Group)

Two non-woven fabric separators made of cellulose were prepared. The thickness of each separator was 8 μm. Next, one of the separators, the positive electrode, the other of the separators, and the negative electrode were stacked in this order to form a wound body. This was continuously performed, and the wound body thus obtained was arranged so that the separators were positioned at the outermost periphery. Next, a coil of the wound body obtained was pressed while being heated. A wound electrode group was thus produced.

(Preparation of Nonaqueous Electrolyte)

A mixed solvent in which propylene carbonate and diethyl carbonate are mixed at a volume ratio of 1:2 was prepared as a nonaqueous solvent. A nonaqueous electrolyte was prepared by dissolving $LiPF_6$ as an electrolyte salt at a concentration of 1.0 mol/L in the mixed solvent.

(Assembly of Battery)

Electrode terminals were attached to the positive electrode and the negative electrode of the wound electrode group obtained as described above. The electrode group was placed in a rectangular container made of aluminum. The nonaqueous electrolyte described above was injected into the container, and the container was sealed to obtain a nonaqueous electrolyte battery. The nonaqueous electrolyte battery was designed such that the nominal capacity was 26 Ah.

Example 2

A nonaqueous electrolyte battery was produced in the same manner as in Example 1 except that the thicknesses of the separators were changed to 6 μm.

Example 3

A nonaqueous electrolyte battery was produced in the same manner as in Example 1 except that the thicknesses of the separators were changed to 10 μm.

Comparative Example 1

A nonaqueous electrolyte battery was produced in the same manner as in Example 1 except that the press load was changed to about 6 kN/cm and the porosity of the positive electrode was changed to 26.6%.

batteries were charged from a 0% SOC (state of charge) to a 100% SOC at 2 C in a 45° C. environment and then discharged from a 100% SOC to a 0% SOC at 2 C. The rate of increase in AC resistance after the 1000 cycles and the rate of increase in DC resistance after the 1000 cycles were measured. Table 1 shows the results of the measurement. The rate of increase in resistance was calculated by setting 0 cycle as 1.

In addition, the secondary batteries were stored in a 100% SOC for 28 days in a 65° C. environment, and then the rate of increase in AC resistance and the rate of increase in DC resistance were measured. Table 1 shows the results of the measurement. The rate of increase in resistance was calculated by setting the value before storage as 1.

The above-described cycle test and calendar test were performed so that the positive electrode potential in a 100% SOC was higher (i.e., 4.25 vs. $Li/Li^+$) than 4.2 V (vs. $Li/Li^+$).

Table 1 shows the average circularity at 25% in the cumulative distribution and the average circularity at 90% in the cumulative distribution. The method of measuring each average circularity is as described above. FIG. 1 shows the cumulative distribution of the circularity of the positive electrode active material-containing layer of Example 1.

TABLE 1

| | Particle Type | Average Particle Size D50 [μm] | Cumulative Distribution 25% Average Circularity | Cumulative Distribution 90% Average Circularity | Porosity [%] | Rate of Increase In AC Resistance After 1000 Cycles | Rate of Increase In DC Resistance After 1000 Cycles | Rate of Increase In AC Resistance After 28 Days | Rate of Increase In DC Resistance After 28 Days |
|---|---|---|---|---|---|---|---|---|---|
| Example 1 | Single Particles | 4 | 0.535 | 0.794 | 22.9 | 1.06 | 1.06 | 1.07 | 1.25 |
| Example 2 | Single Particles | 4 | 0.535 | 0.794 | 22.9 | 1.05 | 1.07 | 1.06 | 1.24 |
| Example 3 | Single Particles | 4 | 0.535 | 0.794 | 22.9 | 1.07 | 1.05 | 1.06 | 1.23 |
| Comparative Example 1 | Single Particles | 4 | 0.535 | 0.794 | 26.6 | 1.34 | 1.34 | 1.38 | 1.59 |
| Comparative Example 2 | Polycrystals | 4.4 | 0.565 | 0.818 | 28.3 | 1.15 | 1.29 | 1.14 | 1.36 |

Comparative Example 2

A lithium-containing nickel cobalt manganese composite oxide $LiNi_{0.8}Co_{0.1}Mn_{0.1}O_2$ formed of polycrystals (secondary particles) was prepared as an active material. The average particle size (D50) of the prepared active material was 4.4 μm. A nonaqueous electrolyte battery was produced in the same manner as in Example 1 except that this positive electrode active material formed of secondary particles was used to perform pressing under the same load as that in Example 1.

The obtained secondary batteries were subjected to 1000 charge-discharge cycles, in each of which the secondary As is clear from Table 1, Examples 1 to 3 exhibited lower AC resistance and lower DC resistance than Comparative Examples 1 and 2 in the 45° C.-2 C cycling in a SOC of 0% to 100%. In the 65° C.-100% SOC calendaring, the AC resistance and the DC resistance were similarly low. This demonstrates that the battery of the embodiment of the invention is superior to the other batteries in suppressing an increase in resistance.

Example 4

A nonaqueous electrolyte battery was produced in the same manner as in Example 1 except that $LiNi_{0.8}Co_{0.1}Mn_{0.1}O_2$ single particles having an average particle size (D50) of 3.5 μm were used.

Example 5

A nonaqueous electrolyte battery was produced in the same manner as in Example 1 except that $LiNi_{0.85}Co_{0.075}Mn_{0.075}O_2$ single particles having an average particle size (D50) of 3.5 μm were used and the press load was changed to about 9 kN/cm to change the porosity of the positive electrode to 22.9%.

A cycle test and a calendar test were performed on the obtained secondary batteries under the above-described conditions, the results of which are shown in Table 3. Table 3 also shows the results of Examples 1 to 3 and Comparative Examples 1 and 2.

Table 2 shows the type of particles of the positive electrode active material, the composition of the positive electrode active material, the average particle size D50, the average circularity at 10% in the cumulative distribution, the average circularity at 25% in the cumulative distribution, the average circularity at 75% in the cumulative distribution, the average circularity at 90% in the cumulative distribution, and the porosity of Examples 4 and 5. Table 2 also shows the measurement results of Examples 1 to 3 and Comparative Examples 1 and 2.

TABLE 2

| | Particle Type | Positive Electrode Active Material Composition | Average Particle Size D50 [μm] | Cumulative Distribution 10% Average Circularity | Cumulative Distribution 25% Average Circularity | Cumulative Distribution 75% Average Circularity | Cumulative Distribution 90% Average Circularity | Porosity [%] |
|---|---|---|---|---|---|---|---|---|
| Example 1 | Single Particles | $LiNi_{0.9}Co_{0.1}Mn_{0.1}O_2$ | 4 | 0.458 | 0.535 | 0.711 | 0.794 | 22.9 |
| Example 2 | Single Particles | $LiNi_{0.8}Co_{0.1}Mn_{0.2}O_2$ | 4 | 0.458 | 0.535 | 0.711 | 0.794 | 22.9 |
| Example 3 | Single Particles | $LiNi_{0.6}Co_{0.1}Mn_{0.1}O_2$ | 4 | 0.458 | 0.535 | 0.711 | 0.794 | 22.9 |
| Example 4 | Single Particles | $LiNi_{0.9}Co_{0.1}Mn_{0.1}O_2$ | 3.5 | 0.47 | 0.546 | 0.73 | 0.81 | 22.9 |
| Example 5 | Single Particles | $LiNi_{0.85}Co_{0.075}Mn_{0.075}O_2$ | 3.5 | 0.481 | 0.560 | 0.745 | 0.820 | 22.9 |
| Comparative Example 1 | Single Particles | $LiNi_{0.8}Co_{0.1}Mn_{0.1}O_2$ | 4 | 0.458 | 0.535 | 0.711 | 0.794 | 26.6 |
| Comparative Example 2 | Polycrystals | $LiNi_{0.6}Co_{0.1}Mn_{0.1}O_2$ | 4.4 | 0.489 | 0.565 | 0.742 | 0.818 | 28.3 |

TABLE 3

| | Rate of Increase In AC Resistance After 1000 Cycles | Rate of Increase In DC Resistance After 1000 Cycles | Rate of Increase In AC Resistance After 28 days | Rate of Increase In DC Resistance After 28 days | Average Value of Rate of Increase In Resistance |
|---|---|---|---|---|---|
| Example 1 | 1.06 | 1.06 | 1.07 | 1.25 | 1.11 |
| Example 2 | 1.05 | 1.07 | 1.06 | 1.24 | 1.11 |
| Example 3 | 1.07 | 1.05 | 1.06 | 1.23 | 1.10 |
| Example 4 | 1.07 | 1.00 | 1.06 | 1.03 | 1.04 |
| Example 5 | 1.20 | 1.15 | 1.12 | 1.09 | 1.14 |
| Comparative Example 1 | 1.34 | 1.34 | 1.38 | 1.59 | 1.41 |
| Comparative Example 2 | 1.15 | 1.29 | 1.14 | 1.36 | 1.24 |

As is clear from Tables 2 and 3, the average of the rate of increase in AC resistance in the 45° C.-2 C cycle from a 0% SOC to a 100% SOC, the rate of increase in DC resistance in the 45° C.-2 C cycle from a 0% SOC to a 100% SOC, the rate of increase in AC resistance in the 65° C.-100% SOC calendar, and the rate of increase in DC resistance in the 65° C.-100% SOC calendar is smaller in Examples 1 to 5 than in Comparative Examples 1 and 2. Thus, Examples 1 to 5 excel in the effect of suppressing an increase in resistance during charge-and-discharge cycling and calendaring (storage and preservation).

The results of Comparative Example 1 demonstrate that even if the cumulative distribution of the circularity is the same as those of Examples 1 to 3, the average value of the rate of increase in resistance is large if the porosity is larger than 25%. The results of Comparative Example 2 demonstrate that even if the average circularity at 25% in the cumulative distribution of the circularity is 0.05 to 0.60 and the average circularity at 90% in the cumulative distribution is 0.3 to 0.85, the average value of the rate of increase in resistance is large if the active material is polycrystalline and the porosity is larger than 25%.

A comparison among Examples 1 to 5 also reveals that Examples 1 to 4, in which the average circularity at 25% in the cumulative distribution of the circularity satisfies 0.55 or less and the average circularity at 90% in the cumulative distribution of the circularity satisfies 0.81 or less, have a smaller average value of the rate of increase in resistance than Example 5 and excel in the effect of suppressing resistance in both charge-and-discharge cycling and calendaring (storage and preservation). Examples 1 to 4 are examples in which the average circularity at 10% accumulation satisfies 0.4 to 0.47, the average circularity at 25% accumulation satisfies 0.5 to 0.55, the average circularity at 75% accumulation satisfies 0.65 to 0.73, and the average circularity at 90% accumulation satisfies 0.75 to 0.81.

According to at least one embodiment and example described above, an electrode is provided. The electrode includes an active material-containing layer. The active material-containing layer includes single particles of an active material represented by the formula (1) shown below. In a cumulative distribution of circularity, the average circularity at 25% in the cumulative distribution is 0.05 to 0.60, and the average circularity at 90% in the cumulative distribution is 0.3 to 0.85. The porosity of the active material-containing layer according to a mercury intrusion method is 10% to 25%.

$$Li_aNi_{(1-b-c-d)}Co_bMn_cM_dO_2 \quad (1)$$

wherein $1 \leq a \leq 1.2$, $0 \leq b \leq 0.4$, $0 \leq c \leq 0.4$, $0 \leq d \leq 0.1$, and M is one or more elements selected from the group consisting of Fe, Cu, Ti, Mg, Al, W, Y, B, Mo, Nb, Zn, Sn, Zr, Ga, and V.

According to the above-described electrode, it is possible to suppress an increase in AC resistance and DC resistance even during cycling or calendaring at a high potential.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

Hereinafter, the inventions recited in the original claims of the present application will be appended.

<1> An electrode including a current collector and an active material-containing layer formed on the current collector, wherein the active material-containing layer includes single particles of an active material represented by a following formula (1), and in a cumulative distribution of circularity, an average circularity at 25% in the cumulative distribution is 0.05 to 0.60, and an average circularity at 90% in the cumulative distribution is 0.3 to a porosity of the active material-containing layer according to a mercury intrusion method is 10% to 25%:

$$Li_aNi_{(1-b-c-d)}Co_bMn_cM_dO_2 \quad (1)$$

wherein $1 \leq a \leq 1.2$, $0 \leq b \leq 0.4$, $0 \leq c \leq 0.4$, $0 \leq d \leq 0.1$, and M is one or more elements selected from the group consisting of Fe, Cu, Ti, Mg, Al, W, Y, B, Mo, Nb, Zn, Sn, Zr, Ga, and V.

<2> The electrode according to <1>, wherein the electrode is a positive electrode.

<3> The electrode according to <1> or <2>, wherein the cumulative distribution of circularity is a cumulative distribution of circularity of unit particles constituting the active material-containing layer.

<4> The electrode according to <3>, wherein the unit particles include the single particles and a conductive agent.

<5> A nonaqueous electrolyte battery including: a positive electrode which is the electrode according to any one of <1> to <4>; a negative electrode; and a nonaqueous electrolyte.

<6> A battery pack including the nonaqueous electrolyte battery according to <5>.

What is claimed is:

1. An electrode comprising a current collector and an active material-containing layer formed on the current collector, wherein the active material-containing layer comprises single particles of an active material represented by a following formula (1) and a conductive agent, and in a cumulative distribution of circularity of unit particles, an average circularity at 25% in the cumulative distribution is 0.05 to 0.60, and an average circularity at 90% in the cumulative distribution is 0.3 to 0.85, the unit particles comprise the single particles, and an aggregate which is a composite of the single particles and the conductive agent, and a porosity of the active material-containing layer according to a mercury intrusion method is 10% to 25%:

$$Li_aNi_{(1-b-c-d)}Co_bMn_cM_dO_2 \quad (1)$$

wherein $1 \leq a \leq 1.2$, $0 \leq b \leq 0.4$, $0 \leq c \leq 0.4$, $0 \leq d \leq 0.1$, and M is one or more elements selected from the group consisting of Fe, Cu, Ti, Mg, Al, W, Y, B, Mo, Nb, Zn, Sn, Zr, Ga, and V.

2. The electrode according to claim 1, wherein the electrode is a positive electrode.

3. The electrode according to claim 1, wherein the average circularity at 25% in the cumulative distribution is 0.05 to 0.55.

4. The electrode according to claim 1, wherein the average circularity at 25% in the cumulative distribution is 0.4 to 0.55.

5. The electrode according to claim 2, wherein the average circularity at 25% in the cumulative distribution is 0.4 to 0.55.

6. The electrode according to claim 1, wherein the average circularity at 25% in the cumulative distribution is 0.4 to 0.55, and the average circularity at 90% in the cumulative distribution is 0.5 to 0.81.

7. The electrode according to claim 2, wherein the average circularity at 25% in the cumulative distribution is 0.4 to 0.55, and the average circularity at 90% in the cumulative distribution is 0.5 to 0.81.

8. The electrode according to claim 1, wherein an average circularity at 10% in the cumulative distribution is 0.4 to 0.47.

9. The electrode according to claim 2, wherein an average circularity at 10% in the cumulative distribution is 0.4 to 0.47.

10. The electrode according to claim 1, wherein an average circularity at 75% in the cumulative distribution is 0.65 to 0.73.

11. The electrode according to claim 2, wherein an average circularity at 75% in the cumulative distribution is 0.65 to 0.73.

12. A nonaqueous electrolyte battery comprising:

a positive electrode which is the electrode according to claim 1;

a negative electrode; and a nonaqueous electrolyte.

13. A battery pack comprising the nonaqueous electrolyte battery according to claim 12.

* * * * *